Feb. 10, 1970   H. S. JACKSON ETAL   3,495,018
ARC VOLTAGE CONTROL FOR CONSUMABLE ELECTRODE FURNACES
Filed April 19, 1968   2 Sheets-Sheet 1
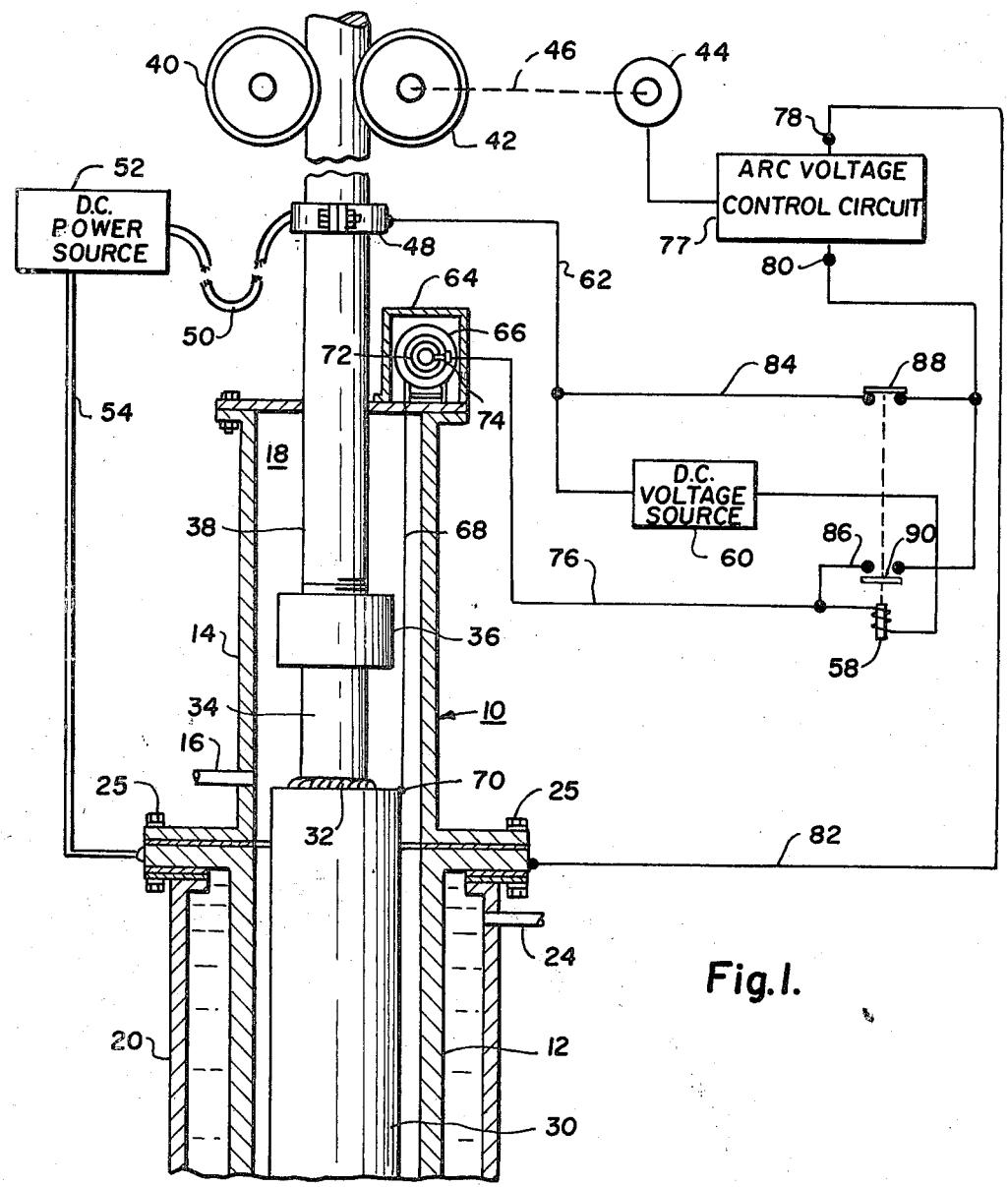
Fig.1.
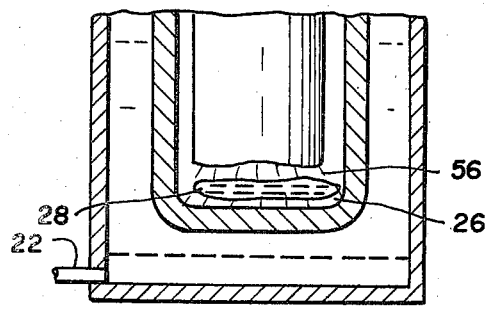
INVENTOR.
HAROLD S. JACKSON
JAMES B. MURTLAND, JR.
BY
*Murray & Linkhauer*
their ATTORNEYS 3,495,018
ARC VOLTAGE CONTROL FOR CONSUMABLE
ELECTRODE FURNACES
Harold S. Jackson, Troy, N.Y., and James B. Murtland, Jr., Natrona Heights, Pa., assignors to Allegheny Ludlum Steel Corporation, Brackenridge, Pa., a corporation of Pennsylvania
Continuation-in-part of application Ser. No. 396,523, Sept. 15, 1964. This application Apr. 19, 1968, Ser. No. 722,771
Int. Cl. H05b 7/10
U.S. Cl. 13—14        9 Claims

ABSTRACT OF THE DISCLOSURE

A consumable electrode arc voltage control system and method for controlling a consumable electrode furnace which are not affected by voltage drops through the ram drive system and electrode clamp of the furnace, or by voltage drops through a weld connection of the electrode to a stub. Also described is a system for preventing burning and damage to the electrode clamp of such a furnace.

CROSS-REFERENCES TO RELATED APPLICATIONS

This application is a continuation-in-part of copending application Ser. No. 396,523, filed Sept. 15, 1964, and assigned to the assignee of the present application.

BACKGROUND OF THE INVENTION

Consumable arc melting furnaces are now well known and usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually, in starting the melt, a small supply of chips or the like is placed in the mold so that when the arc is struck such chips are melted to form an initial molten metal supply in the crucible mold. As the arc is maintained between the electrode to be melted and the molten pool of metal beneath it, the end of the electrode is melted due to the heat of the arc. As the electrode is melted, it is deposited in the mold and forms the aforesaid molten pool, the bottom portion of which continuously solidifies as the electrode melts to form an ingot which increases in length, starting from the bottom upwardly. In this process impurities float to and on the top of the molten pool; and assuming that the pool does not solidify during the formation of the ingot, the major portion of the impurities will be excluded from the main body of the ingot.

The arc gap between the bottom of the electrode and the molten pool is usually in the range of about two inches or less; and it has been the practice to control the position of the electrode relative to the molten pool to maintain a more or less fixed arc gap, the theory being that with a fixed arc gap, the melting procedure will be more or less uniform to produce the desired characteristics in the resulting ingot. Many systems for maintaing the arc gap rely upon arc voltage (i.e., the voltage gradient across the gap) for regulating purposes, either during the entire melting process or during a portion thereof. That is, the arc voltage, or approximation thereof, is detected and this voltage is used to drive a motor which raises or lowers the electrode, as the case may be, to maintain the arc gap.

One of the difficulties experienced with control systems utilizing arc voltage for regulating purposes is errors in detected arc voltage due to the fact that arc voltage is not measured directly. That is, in the usual system the arc voltage is measured between the connection of the direct current voltage source to the ram and its connection to the mold on the theory that no voltage drops occur between the power connection to the ram and the electrode. Between these points, however, are areas which can affect the voltage readings obtained. Thus, the electrode is attached by a clamp to the bottom of the ram; and it sometimes happens that arcing and excessive heating occur at this point due to a poor connection between the clamp and the electrode. Furthermore, in certain consumable electrode furnaces a stub is welded to the upper end of the electrode, this stub being grasped by the clamp. If the weld between the stub and the electrode is poor, arcing and heating may occur, also causing a false arc voltage indication. Finally, a voltage drop which alters the indicated true arc voltage may occur at the terminal connecting the ram to the arc voltage source. These errors in detected arc voltage, which can be erratic, grievously affect the ram feed control system and oftentimes result in the production of inferior ingots.

Another difficulty with prior art consumable electrode control systems is that during hot topping, there is a possibility that the electrode stub and clamp might become damaged because the melting process continues too long. In the past, no satisfactory means has been provided for preventing this possibility, which is complicated by the fact that the furnace operator cannot readily observe what is occurring within the furnace.

SUMMARY OF THE INVENTION

Accordingly, as an overall object, the present invention provides a consumable electrode arc voltage control system and method wherein substantially true arc voltage is measured and used as a control parameter.

More specifically, an object of the invention is to provide a consumable electrode arc voltage control system and method wherein errors in detected arc voltage due to voltage drops in the ram, clamp and stub weld are eliminated.

Still another object of the invention is to provide a new and improved method for controlling a consumable electrode furnace.

A further object of the invention is to provide means in a consumable electrode furnace for preventing the possibility of damage to the electrode clamp because of the melting operation continuing too long.

In accordance with the invention, the arc gap is controlled during the major portion of the melting cycle as a function of the voltage existing between the top of the electrode itself and the mold, and at the completion of the melting operation and during hot topping as a function of the voltage between the mold and the connection of the power input to the ram.

This is accomplished by providing relay means and a source of voltage therefor connected between the connection of the power source to the ram and a weld or other connection to the top of the electrode such that a circuit will be completed to energize the relay means during most of the melting procedure through the ram, electrode clamp and stub weld. When, however, the electrode is nearly completely melted, the circuit between the relay means and the source of voltage will be broken by virtue of the fact that the weld or other connection at the top of the electrode will also be melted at this time. When the relay means is energized, it serves to connect the arc voltage control system to the mold and the electrode itself; and when the relay means is deenergized, the arc voltage control system is connected to the mold and to the ram in the conventional manner. Thus, during the major portion of the melting cycle, voltage is measured between the electrode itself and the mold, thereby eliminating errors due to voltage drops in the ram, electrode clamp, stub weld and the like. However, at the end of the melting cycle, and particularly during hot topping, arc voltage control, while affected by the errors mentioned above, is still effective.

In another embodiment of the invention, a plurality of parallel leads are welded to the top of the electrode such that if one lead should break before the electrode is consumed, the other lead will still measure arc voltage between the top of the electrode and the mold. Additionally, leads are connected to the stub shaft welded to the top of the electrode; and if these should become melted and broken during the melting operation, it is known that melting has continued too long and that the furnace should be shut down. Accordingly, means are provided for automatically stopping the melting operation when the leads connected to the stub shaft are melted, thereby eliminating the possibility of damage to the electrode clamp.

The above and other objects and features of the invention will become apparent from the following detailed description taken in connection with the accompanying drawings which form a part of this specification, and in which:

FIGURE 1 is a schematic illustration of one embodiment of the invention; and

Figure 2:
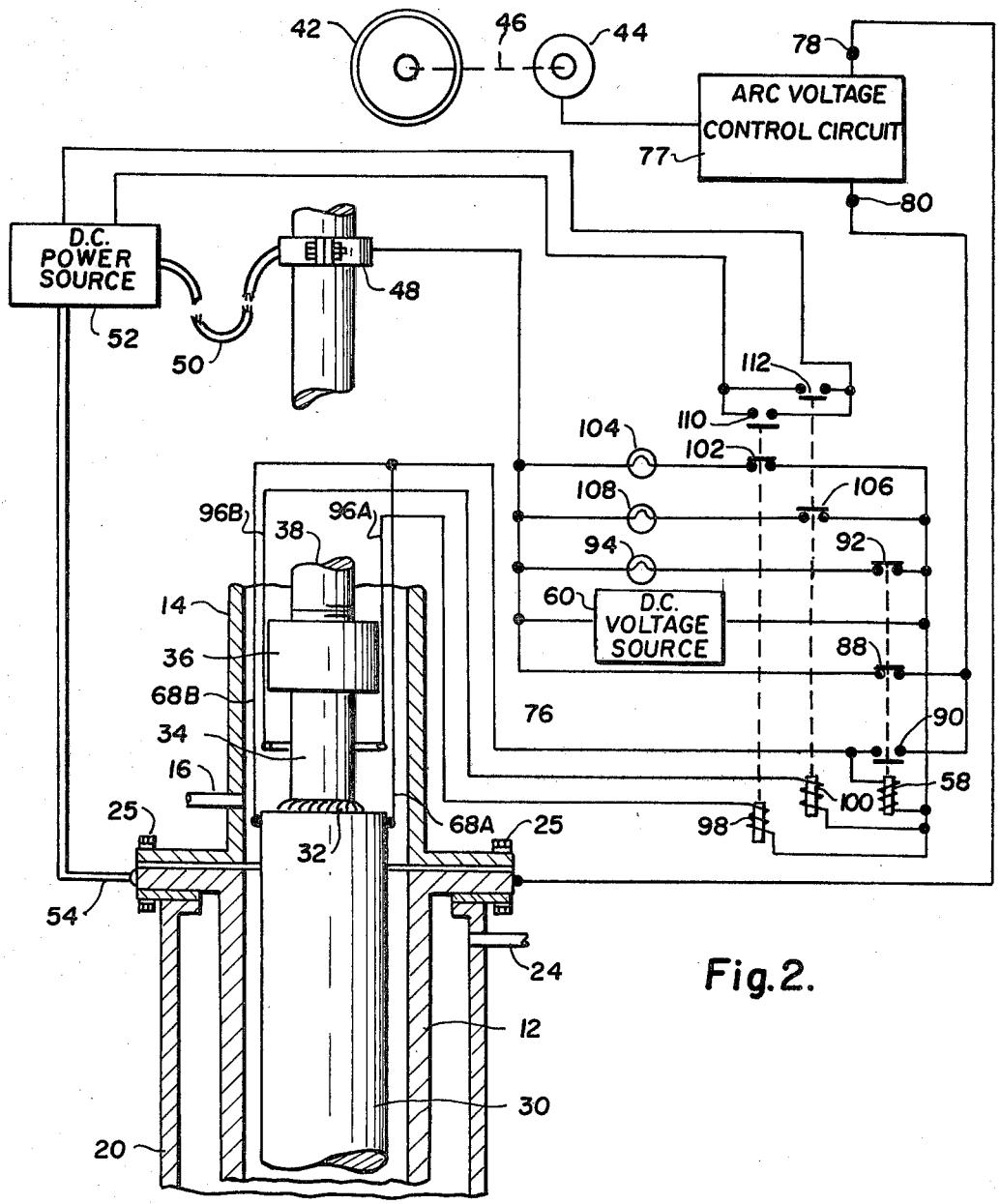
FIGURE 2 is a schematic illustration of another embodiment of the invention incorporating means for preventing damage to the electrode clamp of the furnace.

Referring now to the drawings, and particularly to FIG. 1, a consumable electrode arc furnace is shown and identified generally by the reference numeral 10. The furnace comprises a conductive mold or crucible 12 which may, for example, be fabricated of copper. Covering the upper open end of the mold 12 is a gas-tight housing 14 having a connection 16 to means, not shown, for evacuating the chamber 18 formed by the mold 12 and and the housing 14 covering it. Alternatively, the chamber 18 could be filled with inert gas; however, in either case, the metal to be melted is protected from oxidation. Surrounding the mold 12 is a water jacket 20 having inlet and outlet ports 22 and 24 connected thereto. The water jacket 20 is secured to the mold 12 and housing 14 by means of circumferentially spaced bolts 25 and suitable gaskets, substantially as shown.

The mold 12 contains the ingot 26 (shown as it is initially formed) which solidifies from a molten pool 28 adjacent the lower end of an electrode 30 of the metal to be melted. The electrode 30 is welded as at 32 to a stub shaft 34. The stub shaft 34, in turn, is secured by means of an electrode clamp 36 to the lower end of a vertically reciprocable ram 38. Any type of suitable electrode clamp 36 may be utilized in accordance with the invention; however, one illustrative type is shown in U.S. Patent No. 3,046,319.

While the ram 38 may be reciprocated by any one of the number of different mechanical drives, the system herein illustrated comprises a pair of hourglass rolls 40 and 42, the roll 42 being connected to a drive motor 44 through linkage 46. The motor 44, in turn, is controlled by means of an arc voltage control circuit 46 which may, for example, comprise the usual arc voltage control system wherein the ram 38 is raised or lowered as a function of the voltage existing across the arc between the bottom of electrode 30 and the molten pool 28.

Surrounding the ram 38 is a ram clamp 48 connected through a first flexible cable or lead 50 to a source of direct current power 52. The other terminal of the power source 52 is connected through a cable or lead 54, as shown, to the mold 12. Thus, upon the application of a direct current potential between the clamp 48 and the mold 12, an arc 56 is formed between the bottom of the electrode 30 and the molten pool 28.

As was mentioned above, it is usual practice, in starting the melt, to place a small supply of chips or the like at the bottom of the mold 12 such that when the arc is struck the chips are melted to form an initial molten metal supply in the crucible mold. After the arc is initially struck, the arc is maintained between the electrode to be melted and the molten pool of metal beneath it, the electrode being melted due to the heat of the arc. As the electrode is melted, it is moved downwardly by motor 44 to maintain the desired arc gap.

In the past, it has been common to control the position of the electrode 30 with respect to the molten pool 28 by sensing the voltage existing between the clamp 48 and the mold 12. The difficulty with this method, however, is that voltage drops occur in the ram, the electrode clamp 36 and sometimes in the weld 32. In accordance with the present invention, and in contrast to prior art procedures, the voltage sensing means comprises a relay 58 connected in series with a direct current voltage source 60 between the clamp 48 and the top of the electrode 30.

One terminal of the direct current voltage source 60 is connected directly to the clamp 48 by a lead 62; while the relay 58 is connected to the upper end of electrode 30 through means including a sealed reel housing 64 which is secured in sealed, communicating relation to the housing 14. The reel housing 64 has disposed therein a rotatable, spring-biased reel 66, electrically insulated from the housing, and on which a length of insulated wire 68 is spooled. The lower end of the wire 68 is welded or otherwise securely fastened to the upper end of the electrode as at 70. Preferably, the weld 70 is positioned such that it will melt to break the circuit between voltage source 60 and the relay 58 just before the electrode is completely melted. The end of the insulated wire 68 on reel 66 may be connected, in accordance with procedures well known to those skilled in the art, to an annular strip of conducting material 72 which, in turn, makes contact with a stationary contact member 74 in a manner somewhat similar to a slip ring of an alternating current motor or generator. The contact 74, in turn, is connected through a seal in the wall of housing 64 and via lead 76 to the relay 58, substantially as shown. If desired or necessary, a plurality of leads or wires 68 may be connected in parallel to the top of the electrode at spaced points to increase reliability in the event any one connection should break during the major portion of the melting cycle.

The motor 44 is controlled by the arc voltage control circuit 77 having two input terminals 78 and 80. The terminal 78 is connected through lead 82 to the mold 12, substantially as shown. The terminal 80, however, is adapted to be connected to either the clamp 48 or lead 76 through leads 84 and 86, respectively. Included in lead 84 are normally closed contacts 88 of relay 58; while lead 86 includes normally open contacts 90 of relay 58.

In operation, the insulated wire 68 is welded to the upper end of electrode 30 as at 70; and assuming that lead 62 is connected to the ram clamp 48, the voltage source 60 will energize relay 58, thereby closing contacts 90 and opening contacts 88. Hence, the arc voltage sensed by circuit 77 will now be that existing between the electrode 30 and mold 12 while ignoring any voltage drops in the weld 32, clamp 36 or ram 38. Of course, when the electrode is almost completely melted, the weld 70 will melt, thereby breaking the connection between the voltage source 60 and the relay 58. This opens contacts 90 and closes contacts 88 whereby the arc voltage control circuit 77 is now connected between clamp 48 and mold 12. The melting process, including hot topping, can now be finished; however it will be appreciated that during the major portion of the melting cycle the undesirable voltage drops mentioned above are not reflected in the voltage sensed by circuit 77.

With reference now to FIG. 2, another embodiment of the invention is shown wherein elements corresponding to those in FIG. 1 are identified by like reference numerals. In this case, two leads 68A and 68B are connected to the upper end of the electrode 30; and these two leads are connected in parallel through a reel mechanism, not shown, similar to spring-biased reel 66 shown in FIG. 1, to lead 76 and relay 58. Thus, as an arc is struck between the electrode and the bottom of the mold 12, a circuit is completed to the relay 58; contacts 90 are closed and contacts 88 opened. In this manner, terminals 78 and 80 of the arc voltage control circuit 77 are connected to the top of the electrode 30 and the mold 12; and in this respect the operation of the embodiment of FIG. 2 is identical to that of FIG. 1. However, the two leads 68A and 68B insure that if one lead should break for some reason or other before completion of the melting operation, the other lead will still maintain the relay 58 energized until it is melted at the completion of melting of the electrode 30.

The embodiment of FIG. 2 includes a third pair of contacts 92 which open when the relay 58 is energized. When both of the leads 68A and 68B are severed or melted away from the electrode 30 at the completion of a melting operation and relay 58 becomes deenergized, contacts 92 close, thereby energizing an indicating lamp 94. This signals the operator to start the hot topping operation by reducing arc current.

In addition to leads 68A and 68B, two additional leads 96A and 96B are provided, these leads being welded to the stub shaft 34 at a point above its welded connection to the electrode 30. The lead 96A is connected to one side of an energizing coil for relay 98, the other side of the coil being connected to one side of the direct current voltage source 60. Similarly, lead 96B is connected to one side of an energizing coil for relay 100, the other side of the coil being connected to the direct current voltage source 60.

With the arrangement shown, both of the relays 98 and 100 will be energized just so long as their associated leads 96A or 96B are not broken. In this respect, a circuit for the coil of relay 98 is completed through lead 96A, the stub shaft 34, electrode clamp 36, ram 38, and clamp 48 back to the voltage source 60. However, when lead 96A, for example, is broken and the energizing coil for relay 98 deenergized, contacts 102 close, thereby energizing indicating lamp 104. Similarly, when the energizing coil for relay 100 becomes deenergized, contacts 106 close, thereby energizing indicating lamp 108.

When the relay 98 is energized, its contacts 110 are closed, thereby completing a circuit which will enable the arc voltage control circuit 77 to drive motor 44. Similarly, whenever relay 100 is energized, its contacts 112 will close to enable the arc voltage control circuit 77 to control motor 44. However, when both of the relays 98 and 100 are deenergized, indicating that melting has progressed up to the point of connection of leads 96A and 96B to the stub shaft 34, both contacts 110 and 112 will open, thereby shutting off the direct current power source 52. The resultant lack of power (zero arc voltage) causes motor 44 to withdraw the ram, thus ending the melting operation. In this manner, any possibility of continued melting and resulting damage to the electrode clamp 36 is prevented.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A consumable electrode arc furnace having a conductive mold, a vertically reciprocable ram disposed above said mold, a consumable electrode supported by and in electrical contact with said reciprocable ram, electrical power source connected to said ram and said mold to strike an electrical arc between said electrode and said mold, means to vertically position said ram and electrode, arc voltage control circuit means to control said ram positioning means to position said electrode in response to changes in said arc voltage, conductive circuit means connected to said electrode at substantially said electrode's upper limits, sensing means responsive to said conductive means to sense an interruption in said conductive means, first circuit means connecting said arc voltage control circuit means through said conductive means to said electrode responsive to said sensing means, second circuit means connecting arc voltage sensing means through said ram means to said electrode responsive to said sensing means and including means energizing said second circuit means upon interruption of said conductive means whereby said arc voltage control circuit means will be connected directly to said electrode to sense the arc voltage during melting until the conductive means is interrupted whereupon said arc voltage control circuit means will be responsive to said arc voltage through said ram means.

2. Apparatus according to claim 1 wherein clamping means is affixed to said ram for attaching said electrical power source and wherein said conductive means, sensing means, and said first circuit means include a conductor attached to the top portion of said electrode and the energizing coil of a relay and a voltage source connected in series to said clamping means, said first circuit means including a normally open relay contact connected in series with said arc voltage control circuit means and said second circuit means including a normally closed contact operable by said relay energizing coil connected in series with said clamping means and said arc voltage control circuit means.

3. Apparatus according to claim 2 wherein said circuit means includes a plurality of parallel conductors, relay energizing coils, and relay contacts connected to said electrode, clamping means and arc voltage control circuit means wherein an additional voltage control circuit means is available to control said electrode position responsive to said arc voltage in the event of inadvertent interruption in some of said conductive means.

4. Apparatus according to claim 2 including sensing means connected to said ram, intermediate said electrode top and clamp means and means connected to said sensing means responsive thereto for interrupting said power source to said furnace.

5. Apparatus according to claim 4 wherein said sensing means includes a conductor attached to said ram between said clamp means and the top of said electrode connected in series to a relay energizing coil and a voltage source and wherein said means for interrupting said power source to said furnace includes relay contacts operated by said relay energizing coil.

6. Apparatus according to claim 5 including a stub shaft connected to the bottom of said ram by a clamp, said conductor attached to said stub shaft, a relay device and a voltage source connected to said conductor and circuit means responsive to said relay device for shutting down said furnace to prevent operation of said furnace beyond melting of said electrode and damage to said clamp.

7. Apparatus according to claim 4 including a plurality of sensing means connected to said ram, intermediate said electrode top, and ram clamp and means connected thereto for interrupting said power source to said furnace wherein inadvertent interruption in one of said sensing means will not interrupt power to said furnace.

8. Apparatus according to claim 6 including at least two conductors connected to said stub shaft intermediate said electrode and said clamp, each being connected in series with a relay device and a voltage source and said conductor, and circuit means responsive to the plurality of said relay devices for shutting down said furnace only when the plurality of said relay devices are deenergized.

9. A method for controlling a consumable electrode furnace of the type in which an electrode is carried on the lower end of a vertically reciprocable ram and an arc is struck between the bottom of the electrode and a molten pool of metal beneath it by electrically connecting two leads from an electrical power source to the ram at a point above its connection to the electrode and to a mold within which said molten pool is formed; which method comprises the steps of sensing the voltage existing between the furnace mold and the top portion of the electrode itself during the start and major part of the melting cycle of the furnace, controlling the position of said electrode with respect to the molten pool during said start and major part of the melting cycle as a function of the voltage sensed between the mold and the top portion of the electrode itself, sensing the voltage existing between the mold and the connection of said ram to the electrical power source at the completion of the melting cycle and during hot topping, and controlling the position of the electrode in response to the voltage sensed between the mold and the connection of said ram to the electrical power source at the completion of the melting cycle and during hot topping.

References Cited

UNITED STATES PATENTS

| | | | |
|---|---|---|---|
| 2,541,764 | 2/1951 | Herres et al. | 13—9 X |
| 3,019,275 | 1/1962 | Lorenz | 13—31 |
| 3,186,510 | 6/1965 | Rebhun | 13—9 |
| 3,187,159 | 6/1965 | Kilian | 13—9 |
| 3,188,376 | 6/1965 | Lyman | 13—31 |
| 3,354,254 | 11/1967 | Jackson et al. | 13—9 |

BERNARD A. GILHEANY, Primary Examiner

H. B. GILSON, Assistant Examiner

U.S. Cl. X. R.

13—9, 31